Figure 1:
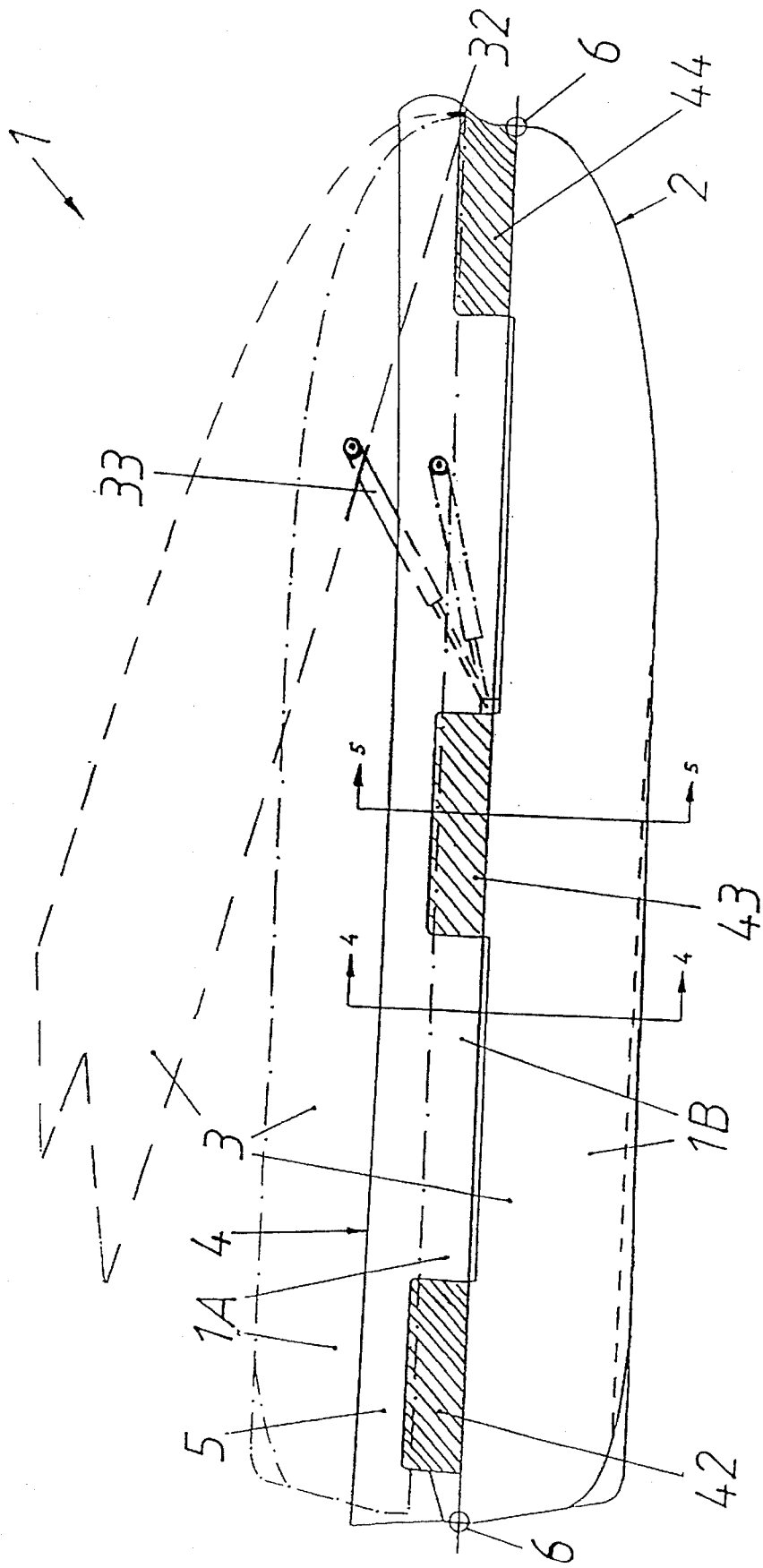

United States Patent [19]
Lundström

[11] Patent Number: 5,645,010
[45] Date of Patent: Jul. 8, 1997

[54] DEVICE FOR A BOX

[76] Inventor: Hans Lundström, Ljungvägen 15, S-435 31, Mölnlycke, Sweden

[21] Appl. No.: 648,163

[22] PCT Filed: Nov. 22, 1994

[86] PCT No.: PCT/SE94/01109

§ 371 Date: May 22, 1996

§ 102(e) Date: May 22, 1996

[87] PCT Pub. No.: WO95/14590

PCT Pub. Date: Jun. 1, 1995

[30] Foreign Application Priority Data

Nov. 26, 1993 [SE] Sweden .................. 9303918.8

[51] Int. Cl.[6] ............................................ B63B 7/04
[52] U.S. Cl. ................... 114/352; 296/157; 114/343
[58] Field of Search ........................... 114/352, 343, 114/344, 361; 296/157

[56] References Cited

U.S. PATENT DOCUMENTS 3,539,219 11/1970 Mueller .................................. 296/157
4,718,587 1/1988 Roberts ................................... 114/352
5,283,702 2/1994 Matheson ................................ 296/157

FOREIGN PATENT DOCUMENTS 0239212 9/1987 European Pat. Off. .
2048462 4/1972 Germany .

Primary Examiner—Jesus D. Sotelo
Attorney, Agent, or Firm—Dvorak and Traub

[57] ABSTRACT

The present invention refers to a device, at a box consisting of an upper part and a lower part of a load box which by said parts can be coupled together to each other to form a storage box and that the box also is provided to be used as a boat. Said box parts are with one of the box parts receivable on top of the other box part, and able to couple together, in order to form a boat or a similar vessel by the lower part of the load box, in a position coupled together with the upper part of the load box, being provided to function as the upper part of the boat body when forming a boat.

18 Claims, 7 Drawing Sheets

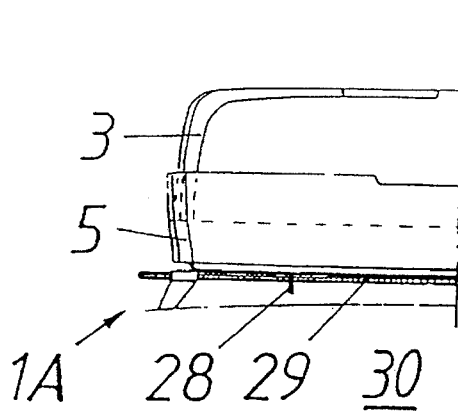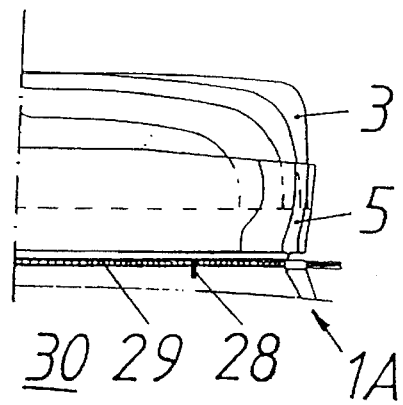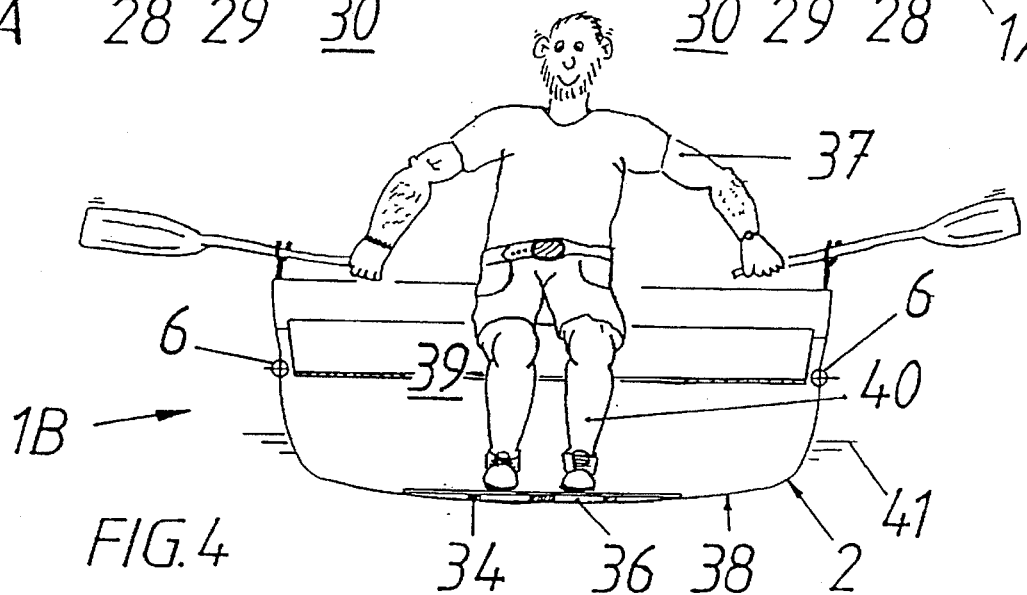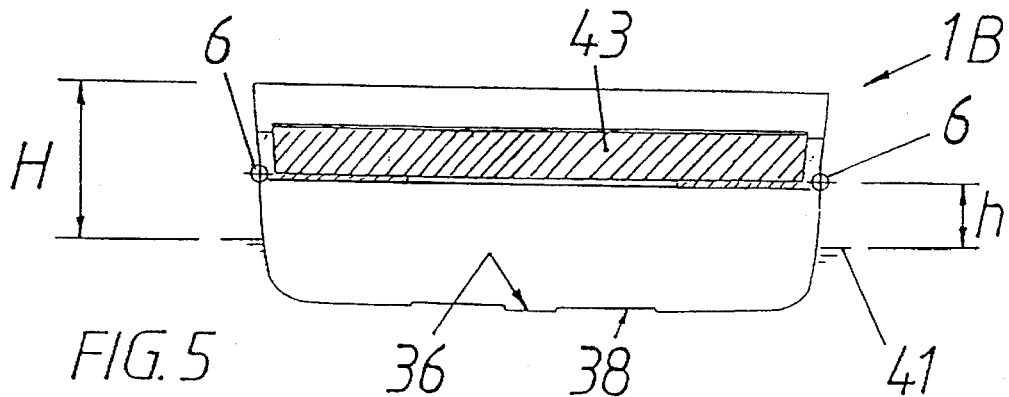

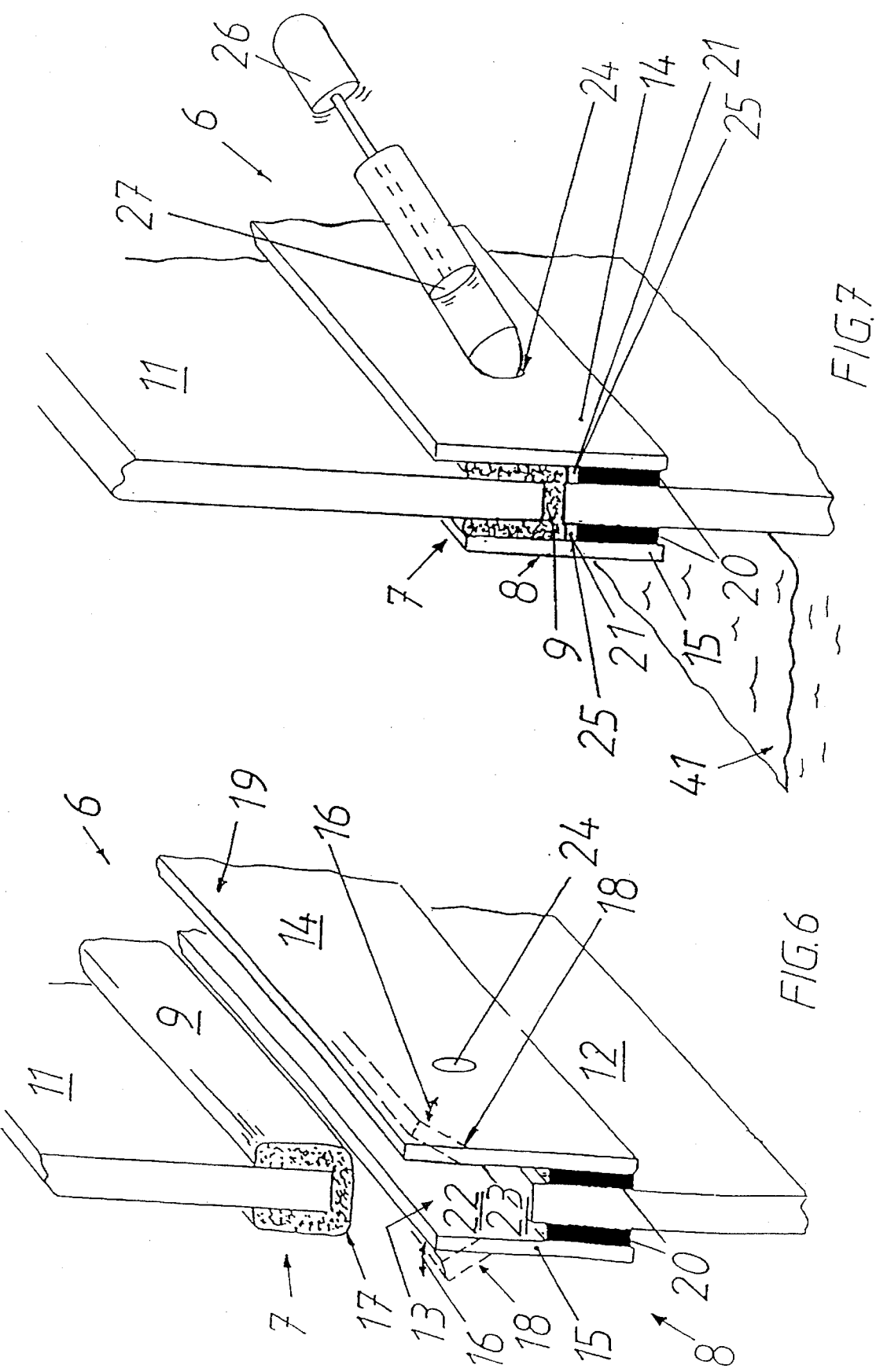

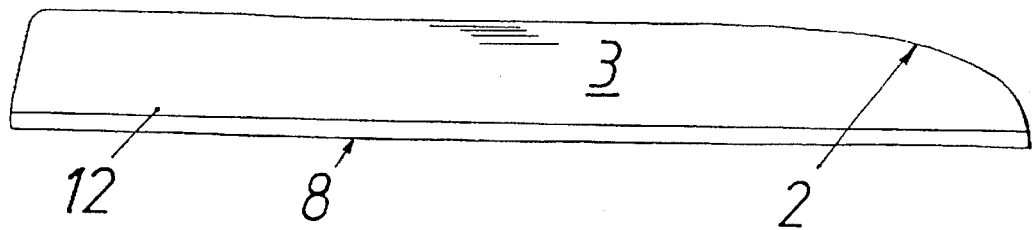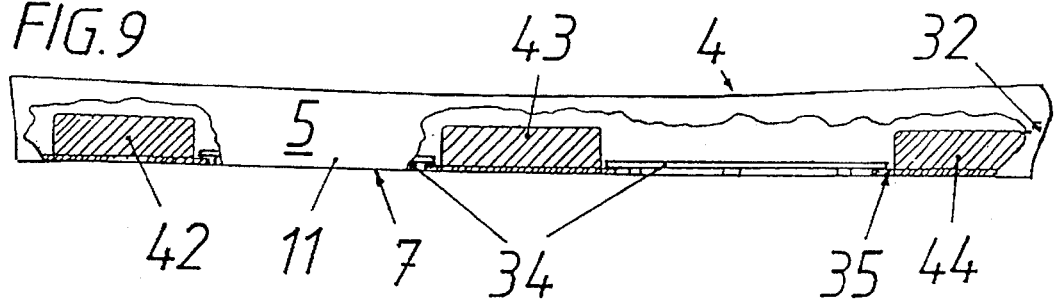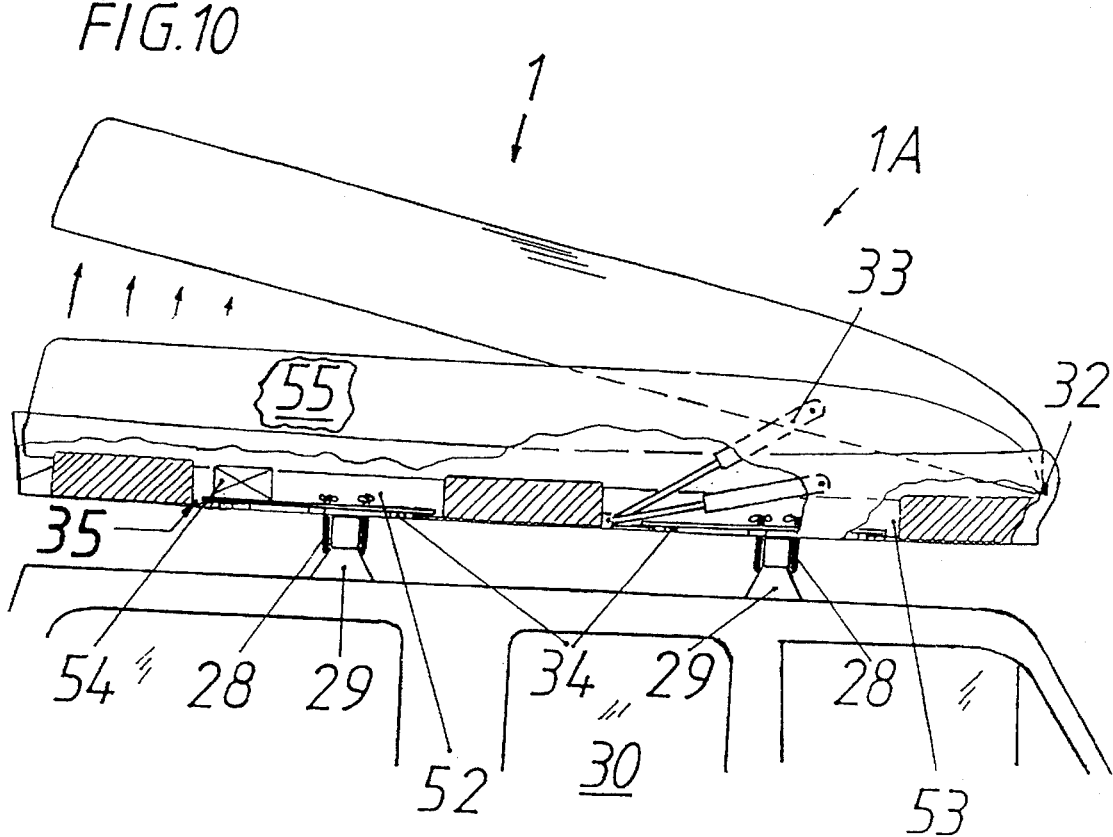

DEVICE FOR A BOX

The present invention refers to a device at a box consisting of an upper part and a lower part of a load box, which by said parts can be coupled together to each other to form a storage box and that the box is also provided to be used as a boat.

Today, different variants of boxes intended to be mounted on vehicle roofs are frequently used. The most common field of application for these is presumably transportation of skis etc. during the winter season, but the roof box can of course be used the remaining part of the year (even if this mostly is not the case) as a complement to the luggage compartment of the car. However, one may generally find the roof box kept in garages etc. during the major part of the year which not only means that the box in itself is not used but also that it occupies a large storage area, which area not too seldom constitutes an item of shortage in garages and storage rooms. Efforts to increase the degree of use of the roof boxes have been made by letting them obtain more fields of application than to merely function as a simple storage box. This has among other things resulted in boxes which in more or less successful designs can be utilized as for example in pulkas or stretchers.

A large roof box, of for example the dimensions 2,20× 1,15×0,30 m, in an upside downwards position confusingly resembles the body of a small boat. A roof box designed such that it also should be able to be used safely as a boat implies an excellent complementary use of the roof box. A convertible roof box/boat at the same time entails extra use of the roof box also during the ice free months of the year and is advantageously used for example at lake fishing. During the winter season a "roof box boat" may constitute a light handy rescue platform for ice fishers, skaters etc., when they are not certain of the buoyancy of the ice or need a sleigh by which equipment and possible fish may be transported.

EP,A1 239 212, U.S. Pat. No. 4,718,587 and DE,A2, 2 048 262 show coupling together of box parts laterally and respectively using only the upper part of a load box as a boat.

Roof box boats according to known designs however exhibit several shortcomings. Present roof box boats only utilize the upper part of the roof box, which normally entails that these obtain a too low freeboard height to provide safe buoyancy and stability. Further the roof boxes become high if they are manufactured according to conventional designs to be able to function as a boat with high freeboard. When such boxes are transported on a vehicle roof they entail an unnecessary great air drag with increased fuel consumption of the vehicle in question as a result. Since roof boxes generally are made of plastic, e.g. glass fibre (GRP), polycarbonate or ABS-plastic reinforcements are required for the body of the boat, which according to a known design is constituted by one part of the box, to prevent that the passengers trample through the same. Further, at crack formation, there is a risk that the vessel sinks, unless it is provided with a double bottom, alternatively float tanks filled either with air or with a float material, e.g of type cellular plastic, which has closed cells. It is also common that the thwarts (seat boards) of the roof box boat are not fixedly anchored in the walls of the roof box but instead detachably mountable in the roof box. This immediately gives the user a problem with loose parts that take up space and may rattle in the roof box when this is utilized as a storage box.

The present invention intends to remedy said problem and thereby also to make the roof box boat safer and more user-friendly.

This purpose is achieved by means of a device according to the present invention which in the main is characterized therein, that said box parts are, with one of the box parts receivable on top of the other box part, able to couple to each other in order to form a boat or a similar vessel by the lower part of the load box, in a coupled together position with the upper part of the load box, being provided to function as the upper part of the boat body when forming a boat.

More specifically the invention is constituted by a device at a box consisting of an upper part and a lower part of load box, which can be coupled together to each other to form a storage box with a storage compartment formed between said parts and that the box also is provided to be used as a boat. Said box parts are, with one box part receivable on top of the other box part, able to couple together, in order to form a boat or a similar vessel.

The lower part of the load box, in a position coupled together with the upper part of the load box, is provided to function as the upper part of the boat body when forming a boat.

The upper part of the load box is connected with its wall end portion to the lower part of the load box below the upper free circumferential edge of the lower part.

The lower part of the load box exhibits an outwards divergent lateral wall with a lowered receiving portion for the upper part of the load box and its wall end portion.

The lower part of the load box exhibits openings through the portion normally constituting bottom of the load box which openings are closable by a number of detachable floor plates.

The lower part of the box has fixedly mounted transverse spars containing air and/or float material and which may function as thwarts and reinforcements.

A coupling, which is provided to operate with a pressure difference between an inner air gap and the outside of the coupling, preferably with under-pressure, is provided to extend along the respective circumferential edge of the box parts in a position with the box parts coupled together as a boat.

The coupling exhibits a cooperable male part and female part, at each other encountering lateral parts of the lower part and the upper part of the box with said air gap in the interior of the female part, with an interjacent preferably elastic strip attached to the male part.

A valve is provided between said air gap and its exterior part, preferably a non-return valve.

One of the lateral edges of the coupling of the female part is higher than the other edge in an edge couple.

Sealing tapes extend along each side of a lateral part and the lateral edges of the respective coupling for sealing of the air gap.

In the following the invention is described in the specification and in referred drawings such as non limiting embodiments, whereby in particular it should be noted that the box described appropriately but not necessarily needs to be realized or used as a conventional roof box, that is with fastening on a vehicle roof, and that the coupling used also is applicable on other optional conformal bodies, for example tubes which are required to be joined detachably by a tight and durable coupling.

In the drawings enclosed, the respective figure represents the following:

FIG. 1. A sketch of a roof box device at the same time showing this in a form of an ordinary roof box of a vehicle as well as in a form joined to a boat.

FIG. 2. Partial sections of a roof box seen from behind.

FIG. 3. Partial sections of the roof box seen from the front.

FIG. 4. A roof box converted to a boat seen in a sectional view, transversely of the longitudinal direction of the boat, between thwarts along the line 4—4 in FIG. 1.

FIG. 5. A roof box converted to a boat in a sectional view, transversely of the longitudinal direction of the boat through a thwart along the line 5—5 in FIG. 1.

FIG. 6. A dismounted coupling.

FIG. 7. A coupled coupling.

FIG. 8. The top of the roof box, also the lower part of the body of the boat, seen from the side.

FIG. 9. The top of the roof box, also the upper part of the body of the boat, seen partly in section.

Figure 11:
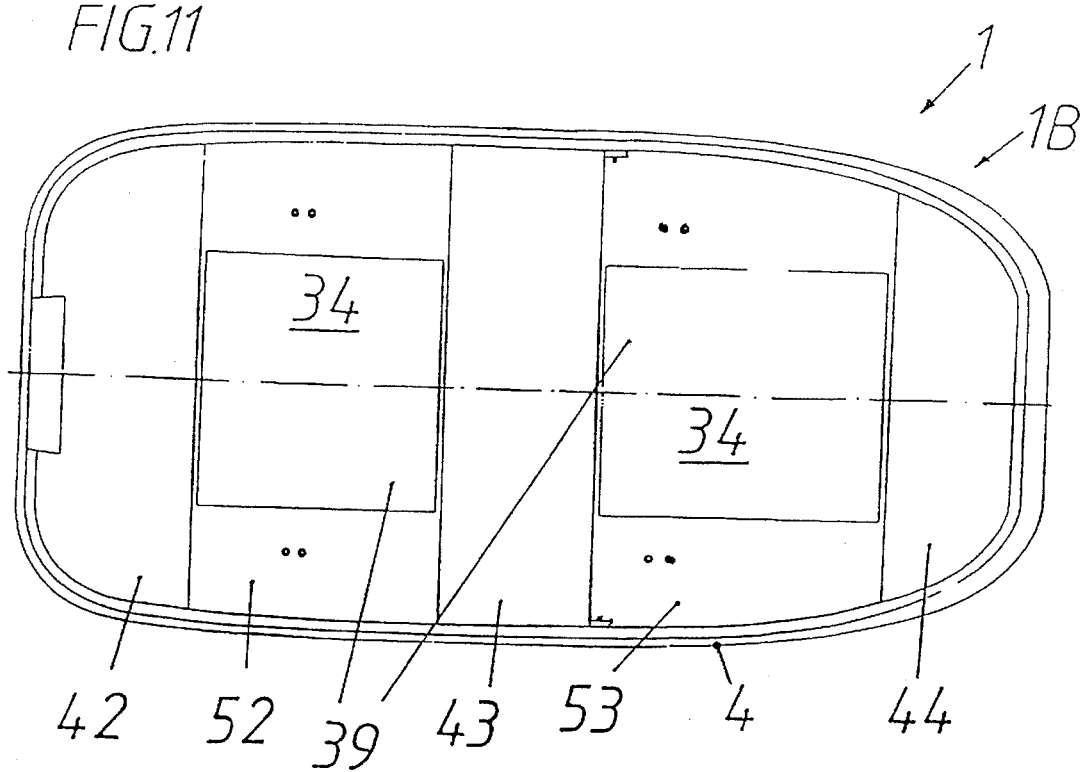

FIG. 10. The roof box seen from the side in open and closed position respectively, partly in section FIG. 11. The roof box converted to a boat, seen from above.

Figure 12:
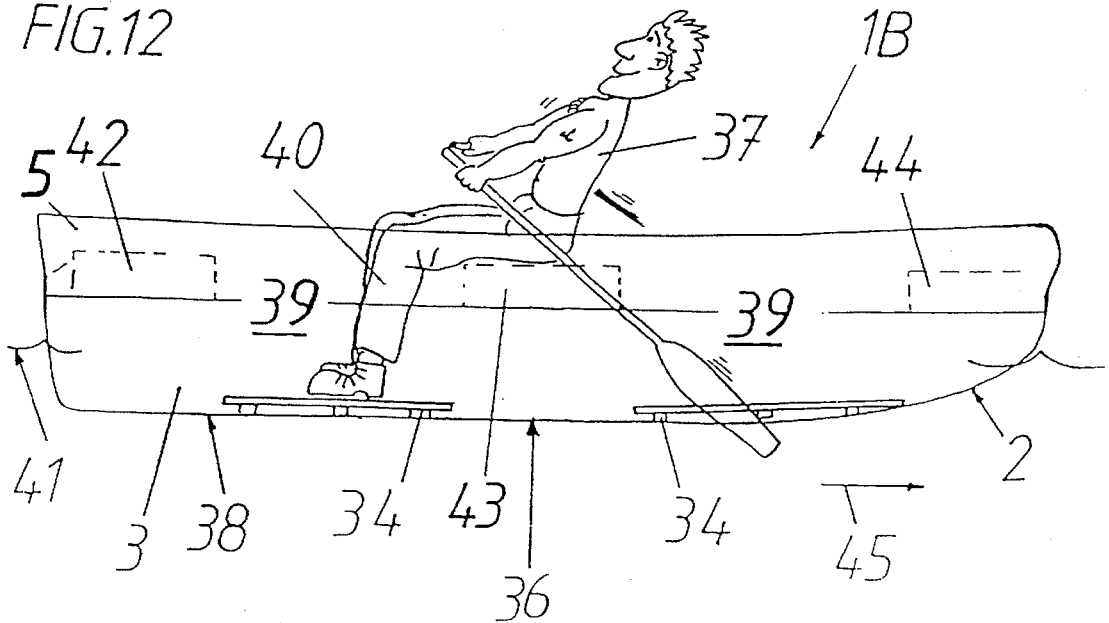

FIG. 12. The roof box converted to a boat, seen from the side.

Figure 13:
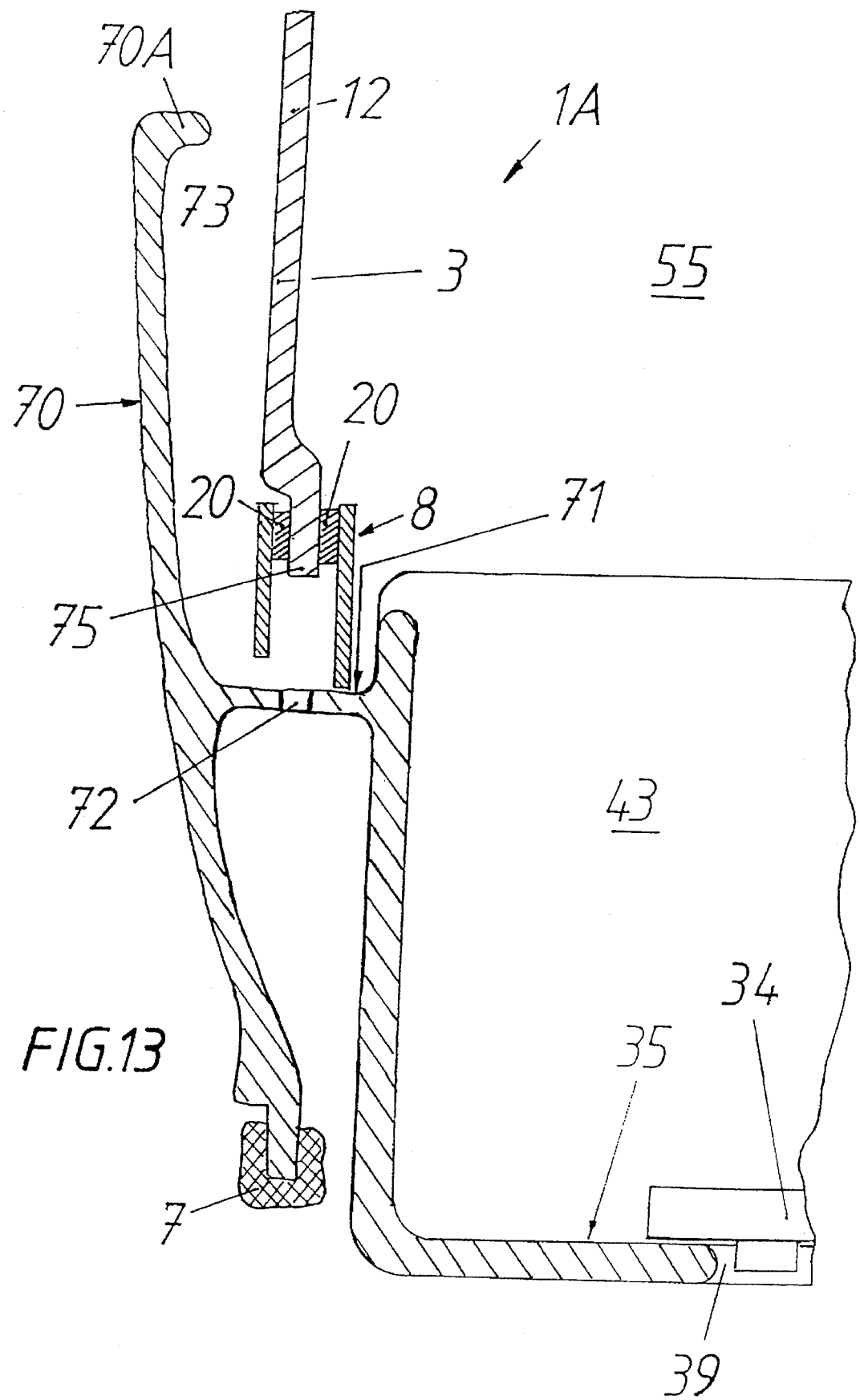

FIG. 13. A detail of box parts coupled together to form a box (section along the line 4—4 in FIG. 1).

Figure 14:
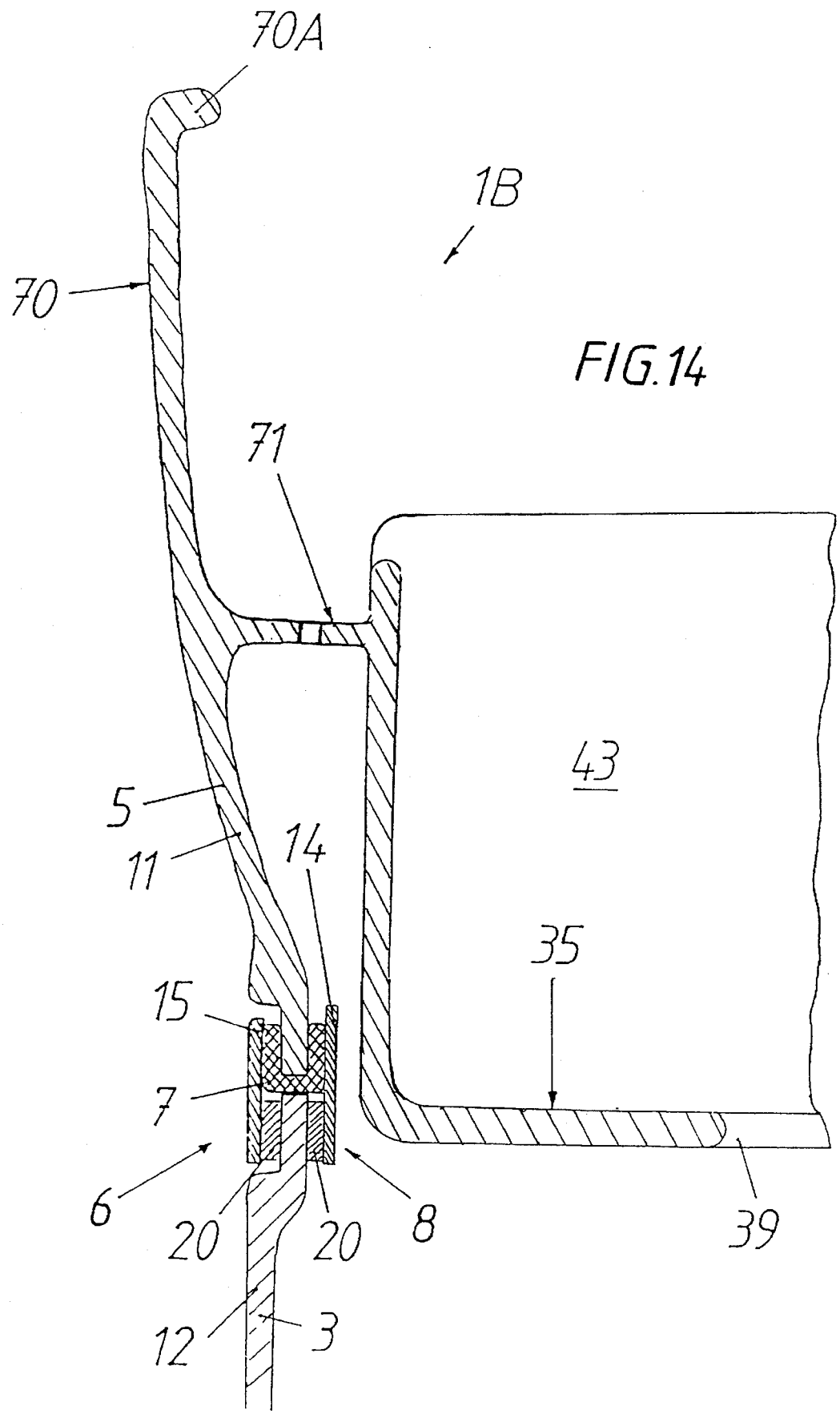

FIG. 14. A detail of box parts coupled together to form a boat (section along the line 4—4 in FIG. 1)

A device 1 according to the present invention is shown in FIG. 1. This is primarily built up from a tub shaped 2 upper part 3 and a border shaped 4 lower part 5 of the load box, which can be joined detachably to each other, in order to form a roof box 1A, see FIG. 10, and by means of a tight coupling 6 in order to form a smaller boat 1B, see FIG. 11 and 12. The coupling 6 preferably consists of a male part 7 and a female part 8, which may be brought together according to FIG. 1 to form a tight joint between the box parts 3,5 when these parts 3, 5 are converted to boat 1B or a similar vessel. The male part 7 o the coupling 6 is preferably constituted by a sealing elastic strip 9 which is located along one of the edges 11 of the lower part 5 of the box. The female part 8, which preferably is permanently attached, with a bolt joint, glueing etc. at the edge 12 of the upper part 3 of the box, is shaped as a tub or a flute 13 with coupling walls 14,15 in pairs, which preferably are somewhat resilient 16 in order to facilitate the coupling to the male part 7, of which one of the coupling walls 14, the inner one, preferably is made somewhat higher than the other coupling wall 15 in the purpose of facilitating the fitting of the male part 7 into the female part 8. The fitting can also be facilitated by means of an appropriate, as a suggestion rounded 17 design of the strip seal 9 of the male part 7 or by bending 18 the upper coupling wall part on one or both walls 14, 15 of the female parts 8. Resiliency 16 of walls 14, 15 of the female part 8 can be achieved by for example manufacturing these in an elastic material, or as shown in FIG. 6 and FIG. 7 where the resiliency of the walls 14,15 relatively the upper part 3 of the box is made possible by means of for instance an elastic sealing tape 20, or another flexible means, which acts between the upper part edge 12 of the box and the walls 14, 15 of the coupling respectively.

When the male part 7 is entered into the female part 8 the male part 7 is prevented to reach the bottom and reach all the way down in the female part 8, by the edge 12 on the upper part 3 of the box bearing against the edge 11 of the lower part of the box via the seal 9. Hereby an air gap 21 is formed which is delimited between the strip seal 9, the edge 12 of the upper part of the box, the coupling-walls 14,15 and the elastic sealing tape 20 etc. Superfluous air 22 inside the space 23 of the female part 8 is pressed out by means of one or more non-return valves 24 connected to said air gap 21. The male part 7 and the female part 8 thereby are efficiently and securely locked to each other through the creation of an under-pressure 25 in the said slot 21, which consequently "sucks" the parts 7,8 together. The under-pressure 25 can for example be created by a simple bicycle pump 26 with reversed non-return valve 27 or another appropriate suction-pump. In order to take the coupling 6 apart the procedure instead will be the inverted. By opening the non-return valves 24 and thereby equalizing the pressure 25 the parts 7,8 can be easily separated. If required one can also pump air into the gap 21 by means of an ordinary bicycle pump in order to easier loosen the parts.

FIG. 2 and FIG. 3 shows sections of the roof box 1A from behind and from the front respectively when this is mounted, with a suitable fastening device 28 on the roof rack 29 of a car 30 or a similar vehicle. The male part 7 and the female part 8 can obviously be placed inverted the embodiment shown, that is, the male part can be constituted by the edge 12 of the upper part 3 of the box and the corresponding female part must then obviously be placed on the edge 11 of the lower part 5 of the box.

The roof box 1A can easily be altered by few measures to a boat 1B according to FIG. 4 and 5 by coupling apart a combined pivot hinge- and securing part 32 situated at one end of the box, preferably the anterior, and release the present gas springs 33 from the upper part 3 of the box, and by lifting off the upper part 3 of the box from the lower part 5, and rotate the upper part 3 of the box 180 degrees about an axis running horizontally at the length extension of the upper part of the box, and subsequently without turning it about place the lower part 5 on top of and tightly together with the upper part 3, whereby the shape of a boat 1B is obtained. After joining together by means of earlier described coupling 6 the boat 1B is ready to use, except for that a detachable floor 34, which normally constitutes part of the bottom 35 of the lower box part 5 of the roof box 1A, must be taken out from the lower box part 5 and instead be placed above the keelson 36, so that a passenger 37 does not trample through the body 38 and that corresponding hole space 39 is created for the legs 40 of the passengers.

FIG. 5 illustrates how the freeboard height H to the water surface 41 is raised essentially through the use of both the upper 3 and the lower part 5 of the roof box 1A to the boat 1B instead of as in existing designs of roof boxes only use the box upper part 3, with which one obtains the considerably lower freeboard height, designated with h.

The upper part 3 of the load box with its wall end portion 75 connects against the lower part 5 of the load box at a level that is situated below the upper free circumferential edge 70A of the lower part 5 of the load box. More specifically the lower part 5 of the load box can be provided such that it exhibits an outwards divergent lateral wall 70 with a lowered receiving portion 71 in order thereby to support and carry the upper part of the load box in the box carrying position when the parts 3, 5 are coupled together to form a box 1A. At the area outside said support receiving portion 71 there may be provided drain openings 72 to enable for rain-water that enters into the space 73 between the lateral wall 70 of the lower part of the box and the lateral wall edge 12 of the upper part of the box, to pass out and flow down on the vehicle roof away from the box when the parts are joined to a box.

The female part 8 of the coupling 6 thereby can be provided to be permanently fixed along the circumferential edge of the upper part of the box thanks to cooperation with the interjacent rubber seal elements 20 and the lateral wall edge 12 of the upper part of the box, such as mentioned earlier.

The both box parts 3, 5 can be manufactured as an integrated unit from the beginning like a moulded boat with a high rail and which afterwards is cut horizontally along the boat formed between thereby constituted divided lateral wall edges in pairs 11 and 12 respectively. Owing to the coupling 6 both parts 3,5 can be joined again when the parts are going to be used as boat, but that the box parts 3,5 can be partly received in each other, and thereby substantially lower the height of the common united parts 3, 5 when they are used as a box 1A.

Inside the lower part 5 of the box there are provided thwarts 42–44 as mentioned and a bottom where floor plates 34 close leg passage openings 39 of the lower part 5 of the box.

Spars 42–44, extending transverse of the moving direction 45 of the boat/the roof box, in the lower part 5 of the box serve as thwarts in the boat 1B at the same time as they with an appropriate filling material, may constitute floats in the event that the boat 1B capsizes or is filled with water.

When the lower part 5 of the box is used as roof box the spars 42–44 may constitute much needed dividers for partitions 52–53 and prevents that goods 54 inside the box move about in the load compartment 55.

The function and the usefulness of a convertible (roof) box/boat as well as the method to detachably couple together the parts thereof should have been evident from the above mentioned and enclosed drawings, in which the invention has been illustrated. As mentioned earlier the invention however is not limited to the embodiments but can be varied within the scope of the patent claims without departing from the inventive concept. Consequently the coupling between the both parts can be constituted by other joining devices than the vacuum coupling shown. For example a conventional hook coupling may come in question, that is, a hook that is pivotably journalled at one of the box/the boat parts and which can be coupled together with a fitting hook arranged at the other box/boat part, preferably with a coupling operating with an over centre function.

I claim:

1. A device (1) at a box (1A) consisting of an upper part (3) and a lower part (5) of a load box, which by said parts (3,5) can be coupled together to each other to form a storage box (1A) and that the box also is provided to be used as a boat, characterized therein, that said box parts (3, 5) are, with one of the box parts (5) receivable on top of the other box part (3), and able to couple together, in order to form a boat (1B) or a similar vessel by the lower part of the load box (5), in a position coupled together with the upper part of the load box (3), being provided to function as the upper part of the boat body when forming a boat (1B).

2. A device according to claim 1, characterized therein, that the upper part of the load box (3) with its wall end portion (75) connects against the lower part of the load box (5) below its upper free circumferential edge (70A).

3. A device according to claim 2, characterized therein, that the lower part (5) of the lad box exhibits an outwards divergent lateral wall (70) with a lowered receiving portion for the upper part of the load box (3) and its wall end portion (75).

4. A device according to claim 3, characterized therein, that the lower part (5) of the load box exhibits openings (39), closable by a number of detachable floor-plates (34), through its part normally constituting bottom of the load box.

5. A device according to claim 4, characterized therein, that the lower part of the box has fixedly mounted transverse spars containing at least one of air and float material and which can function as thwarts and reinforcements.

6. A device according to claim 4, characterized therein, that a coupling, which is provided to operate with a pressure difference between an inner air gap and the outside of the coupling preferably with under-pressure, is provided to extend along the respective circumferential edge of the box parts in a position with the box parts coupled together as a boat.

7. A device according to claim 3, characterized therein, that the lower part of the box has fixedly mounted transverse spars containing at least one of air and float material and which can function as thwarts and reinforcements.

8. A device according to claim 3, characterized therein, that a coupling, which is provided to operate with a pressure difference between an inner air gap and the outside of the coupling preferably with under-pressure, is provided to extend along the respective circumferential edge of the box parts in a position with the box parts coupled together as a boat.

9. A device according to claim 2, characterized therein, that the lower part of the box has fixedly mounted transverse spars containing at least one of air and float material and which can function as thwarts and reinforcements.

10. A device according to claim 2, characterized therein, that a coupling, which is provided to operate with a pressure difference between an inner air gap and the outside of the coupling preferably with under-pressure, is provided to extend along the respective circumferential edge of the box parts in a position with the box pans coupled together as a boat.

11. A device according to claim 1, characterized therein, that the lower part (5) of the box has fixedly mounted transverse spars (42, 43, 44) containing at least one of air and float material and which can function as thwarts and reinforcements.

12. A device according to claim 1, characterized therein, that a coupling, which is provided to operate with a pressure difference between an inner air gap and the outside of the coupling preferably with under-pressure, is provided to extend along the respective circumferential edge of the box parts in a position with the box parts coupled together as a boat.

13. A device according to claim 1, characterized therein, that a coupling (6), which is provided to operate with a pressure difference between an inner air gap (21) and the outside of the coupling preferably with under-pressure (25), is provided to extend along the respective circumferential edge of the box parts in a position with the box parts (3, 5) coupled together as a boat (1B).

14. A device according to claim 13, characterized therein, that the coupling exhibits a cooperable male part (7) and a female part (8) at each other encountering lateral parts (11,12) of a lower part (5) and an upper part (3) of a box, with said air gap (21) in the interior of female part (8), with an interjacent preferably elastic strip (9) attached to the male part (7).

15. A device according to claim 14, characterized therein, that one (14) of lateral edges of the coupling of the female part (14, 15) is higher than the other edge (15) in an edge couple and that sealing tapes (20) extend along each side of a lateral part (12) and the respective lateral edges (14, 15) of the female part (8) in order to seal the air gap (21) of the coupling.

16. A device according to claim 14, characterized therein, that a valve is provided between said air gap and its exterior, preferably a non-return valve.

17. A device according to claim 13, characterized therein, that a valve is provided between said air gap (21) and its exterior, preferably a non-return valve.

18. A device according to claim 17, characterized therein, that one of lateral edges of the coupling of the female part is higher than the other edge in an edge couple and that sealing tapes extend along each side of a lateral part and the respective lateral edges of the female part in order to seal the air gap of the coupling.

* * * * *